United States Patent
Wang et al.

(10) Patent No.: US 9,567,446 B2
(45) Date of Patent: Feb. 14, 2017

(54) MICRO-PARTICLES CONTAINING A 3-D POLYMERIC STRUCTURE

(71) Applicant: Bridgestone Corporation, Tokyo (JP)

(72) Inventors: Xiaorong Wang, Hudson, OH (US); Mindaugas Rackaitis, Akron, OH (US); Naruhiko Mashita, Kanagawa (JP); Victor Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 201 days.

(21) Appl. No.: 14/474,217

(22) Filed: Sep. 1, 2014

(65) Prior Publication Data
US 2015/0057367 A1     Feb. 26, 2015

Related U.S. Application Data

(62) Division of application No. 12/270,452, filed on Nov. 13, 2008, now Pat. No. 8,821,931.

(60) Provisional application No. 60/988,476, filed on Nov. 16, 2007.

(51) Int. Cl.
| | |
|---|---|
| *A61K 9/16* | (2006.01) |
| *A61K 9/50* | (2006.01) |
| *C09K 9/00* | (2006.01) |
| *C09K 19/00* | (2006.01) |
| *C08J 9/28* | (2006.01) |
| *C09K 19/54* | (2006.01) |
| *C11D 17/00* | (2006.01) |
| *C08J 9/36* | (2006.01) |
| *H01F 1/44* | (2006.01) |

(52) U.S. Cl.
CPC .. *C08J 9/28* (2013.01); *C08J 9/36* (2013.01); *C09K 19/544* (2013.01); *C11D 17/0039* (2013.01); *C08J 2201/0522* (2013.01); *C08J 2201/0542* (2013.01); *C08J 2353/00* (2013.01); *H01F 1/44* (2013.01)

(58) Field of Classification Search
None
See application file for complete search history.

(56) References Cited

U.S. PATENT DOCUMENTS

| | | | |
|---|---|---|---|
| 5,451,454 A | | 9/1995 | Fukahori et al. |
| 5,716,997 A | * | 2/1998 | Toyosawa ............... C08L 53/00 521/52 |
| 5,994,468 A | | 11/1999 | Wang et al. |
| RE37,053 E | | 2/2001 | Hanes et al. |
| 2002/0117769 A1 | | 8/2002 | Arch et al. |
| 2003/0185895 A1 | | 10/2003 | Lanphere et al. |
| 2007/0296674 A1 | * | 12/2007 | Aoki ..................... G02F 1/1345 345/94 |

OTHER PUBLICATIONS

M Husing, B Launay, J Bauer, G Kickelbick, D Doshi. "Silicone-Containing Surfactants as Templates in the Synthesis of Mesostructured Silicates." Journal of Sol-Gel Science and Technology, vol. 26, 2003, pp. 609-613.*

Mashita, et al., "Study of Thermoplastic Gels Having a Micro-Cellular Porous Structure and Their Potential on Industrial Applications," Jpn. J. Chem. Eng. Soc., vol. 78, Issue 5, 2005, pp. 147-152.

Wang, et al., "Morphological Transitions of Spinodal Decomposition in Confined Geometry," Polymer, vol. 45, 2004, pp. 2711-2719.

Wang, et al., "Formation of Films of Two-Dimensional Continuous Network Skeleton," ACS Symposium Series 941, Chapter 9, pp. 123-135.

Ryu, et al., "Novel Electrochromic Displays Using Monodisperse Viologen-Modified Porous Polymeric Microspheres," Macromolecular Rapid Communications, vol. 27, 2006, pp. 1156-1161.

Edwards, et al., "Large Porous Particles for Pulmonary Drug Delivery," Science, vol. 276, Jun. 20, 1997, pp. 1868-1871.

The Free Dictionary, Retrieved on: Sep. 2, 2014, Retrieved from: <<http://www.thefreedictionary.com/reticulated>>, 2 pages.

* cited by examiner

*Primary Examiner* — Issac Shomer

(74) *Attorney, Agent, or Firm* — Meredith E. Hooker; Nathan T. Lewis

(57) ABSTRACT

Micro-sized particles having a polymeric structure of cells are provided. Also provided is a method of producing micro-sized particles having a polymeric structure comprising: (1) forming a homogenous solution by heating a mixture of a high molecular weight polymer and a low molecular weight material, wherein said low molecular weight material makes up at least about 50% by weight of the homogenous solution, (2) forming a dispersed solution by dispersing the homogenous solution formed in step (1) into an inert material, (3) cooling the dispersed solution to cause the high molecular weight polymer to phase separate from the low molecular weight material, (4) forming solid particles comprised of said low molecular weight material trapped inside a structure of cells of said high molecular weight polymer, and (5) removing the solid particles from the dispersed solution.

20 Claims, No Drawings

MICRO-PARTICLES CONTAINING A 3-D POLYMERIC STRUCTURE

CROSS-REFERENCE TO RELATED APPLICATIONS

This application is a divisional of Ser. No. 12/270,452, filed Nov. 13, 2008, which in turn claimed the benefit of priority of U.S. provisional application 60/988,476, filed Nov. 16, 2007. Each of these applications is incorporated by reference.

BACKGROUND

Porous materials are well known. Common techniques for creating porous materials such as foams and sponges include expanding fluid, for example, by creating cells through the use of blowing agents, bubbling gas through the fluid, or mechanical agitation. However, it is difficult to form stable micro-sized pores using these methods.

In regard to membrane materials, techniques for making relatively micro-sized pores include stretching, etching, physical perforation, or mixing a base material with a soluble material and dissolving out the soluble material. However, these techniques produce poor cell uniformity and low porosity.

To produce a material with uniform micro-sized pores, it is taught in U.S. Pat. Nos. 5,451,454 and 5,716,997 that a minor amount of a high molecular weight material can be blended with a majority amount of a low molecular weight material. The low molecular weight material can subsequently be removed by an organic solvent, leaving behind a porous material of a three-dimensional continuous network cell-structure of the high molecular weight material. The cells have an average diameter of less than 500 micrometers.

These materials comprising micro-sized pores may be used in, for example, damping applications, separation applications, and adsorption applications. For instance, contaminant-free exchange of gasses may be accomplished using microporous materials. Mold spores, bacteria, and other airborne contaminants will become trapped, while allowing gasses to pass through the material. Similarly, microporous materials may be used as membranes to filter fluids, such as in water purification. However, these materials have a relatively low surface area to expose the cells (pores).

There remains a need to develop a material with a higher surface area of exposed pores to improve adsorption and separation capabilities of a porous material.

SUMMARY OF THE INVENTION

A particle having a diameter between 1 and 500 micrometers is provided, wherein said particle comprises a polymeric structure of cells formed from a polymeric material comprising a polymer having a number average molecular weight of at least 20,000 g/mole, wherein said cells have an average diameter between 0.1 and 50 micrometers.

Also provided is a method for forming a particle having a polymeric structure of cells. The method comprises: (1) forming a homogenous solution by heating a mixture of a high molecular weight polymer having a number average molecular weight ($M_n$) of at least 20,000 g/mole and a low molecular weight material having a $M_n$ of less than 20,000 g/mole, wherein said low molecular weight material makes up at least about 50% by weight of the homogenous solution, (2) forming a dispersed solution by dispersing the homogenous solution formed in step (1) into an inert material, wherein the homogenous solution formed in step (1) is phase separated from the inert material, (3) cooling the dispersed solution to cause the high molecular weight polymer to phase separate from the low molecular weight material, (4) forming solid particles comprised of said low molecular weight material trapped inside a structure of cells of said high molecular weight polymer, and (5) removing the solid particles from the dispersed solution. Optionally, the low molecular weight material may be removed from the particles. Also, the method can include adding a surfactant to the dispersed solution.

DETAILED DESCRIPTION

A high molecular weight polymer is blended with a low molecular material. The high molecular weight material should be present at less than about 50 percent by weight of the blend, or alternatively less than about 30 percent, or alternatively less than about 25 percent.

The high molecular weight polymer has a number average molecular weight (Mn) of at least about 20,000 g/mole, or alternatively at least about 60,000 g/mole, or alternatively at least about 100,000 g/mole. Optionally, the high molecular weight polymer may be crystallizable. Exemplary polymers that may be used as the high molecular weight polymer include, but are not limited to, polyethylene-co-butene), a block copolymer of ethylene and propylene, a block copolymer of polyethylene and an ethylene-styrene random copolymer, a block copolymer of polybutadiene and polystyrene, and a block copolymer of polyethylene and polystyrene, a block copolymer of hydrogenated styrene-butadiene copolymers, butadiene block copolymers, polystyrene, polycarbonates, poly(t-butylstyrene), and polyacrylates. Exemplary crystallizable polymers include, but are not limited to, polypropylene, polyethylene, polycarbonate, polyethylene oxide, polyimides, polyurethane, nylons, syndiotactic polystyrene, syndiotactic polybutadiene, isotactic polystyrene, polyethylene alcohol, and a mixture thereof.

The low molecular weight material has a Mn of less than about 20,000 g/mole, or alternatively less than about 10,000 g/mole, or alternatively less than about 5,000 g/mole. Although there is no particular limitation to the material which can be used, the following is a list of suitable materials:

(1) Softeners: Included are mineral oils, vegetable oils and synthetic softeners for use in rubbers and resins. Exemplary mineral oils include aromatic, naphthenic, and paraffinic process oils. Exemplary vegetable oils include castor oil, cottonseed oil, linseed oil, rape oil, soybean oil, palm oil, coconut oil, peanut oil, haze tallow, pine oil, and olive oil.

(2) Plasticizers: Included are ester plasticizers such as phthalates, phthalic mixed esters, aliphatic dibasic acid esters, glycol esters, fatty acid esters, phosphates, and stearates; epoxy plasticizers; other plasticizers for plastics; and plasticizers for nitrile rubber such as phthalates, adipates, sebacates, phosphates, polyethers, and polyesters.

(3) Tackifiers: Included are coumarone resins, coumarone-indene resins, phenol terpene resins, petroleum hydrocarbons, and rosin derivatives.

(4) Oligomers: Included are crown ether, fluorinated oligomers, polyisobutylene, xylene resin, chlorinated rubber, polyethylene wax, petroleum resin, rosin ester rubber, polyalkylene glycol diacrylates, liquid rubbers (e.g., polybutadiene, styrene-butadiene rubber, butadiene-acrylonitrile rubber, and polychloroprene), silicone oligomers, and poly-α-olefins.

(5) Lubricants: Included are hydrocarbon lubricants such as paraffin and wax; fatty acid lubricants such as higher fatty acids and oxyfatty acids; fatty acid amide lubricants such as fatty acid amides and alkylene bisfatty acid amides; ester lubricants such as fatty acid lower alcohol esters, fatty acid polyhydric alcohol esters and fatty acid polyglycol esters; alcohol lubricants such as aliphatic alcohols, polyhydric alcohols, polyglycois, and polyglycerols; metal soaps; and mixtures thereof.

Other useful low molecular weight materials include latex, emulsion, liquid crystal, bitumen, clay, natural starch, saccharides, inorganic silicone oil, and phosphazenes. Also included are animal oils such as beef tallow, lard, horse tallow, chicken oil, and fish oil; honey, fruit juice, chocolate, dairy products such as yogurt; organic solvents such as hydrocarbon, halogenated hydrocarbon, alcohol, phenol, ether, acetal, ketone, fatty acid, ester, nitrogen compounds and sulfur compound solvents; various pharmaceutical components, proteins, soil modifiers, fertilizers, petroleum, water, and aqueous solutions. These materials may be used alone or in admixture.

The blend of high molecular weight polymer and low molecular weight material is formed into a homogenous solution by mixing and heating the blend. The mixing temperature will be dependent on the high molecular weight material and low molecular weight material employed. The mixing temperature should be high enough such that a homogenous solution is formed. As used herein, a homogenous solution is one that has a substantially uniform composition throughout. One possible method of measuring the uniformity of the solution is by light scattering. A substantially homogenous solution will scatter very little to no light at all. To form a homogeneous solution, the mixing temperature may be from 0° C. to 500° C., or alternatively from 100° C. to 250° C., or alternatively from 150° C. to 200° C.

The homogenous solution may further contain a filler. Exemplary fillers include flake inorganic fillers such as clay, diatomaceous earth, carbon black, silica, carbon nanotubes, talc, barium sulfate, calcium carbonate, magnesium carbonate, metal oxides, mica, graphite, and aluminum hydroxide; granular or powder solid fillers such as metal powder, wood chips, glass powder, and ceramic powder; and natural and synthetic short and long fibers (e.g., straw, wool, glass fibers, metal fibers, and polymer fibers). The inorganic filler surface may be modified in order to facilitate dispersion into the solution. Organic fillers can also be used. Organic fillers include particles, and powder or granules of organic materials that do not dissolve in the solvent or in any of the constituent parts of the micro-sized particles. Exemplary organic fillers include, but are not limited to proteins, polar pharmaceutical substances, powders or granules (e.g. ground rubber), and recycled particles of polymeric materials.

While still at a temperature close to its mixing temperature, the homogenous solution is then dispersed into an inert material to form a dispersed solution. The purpose of forming a dispersed solution is to create micro-sized droplets of the homogenous solution dispersed in an inert material. Thus, the term dispersed solution is defined herein to represent a solution having micro-sized droplets dispersed therein.

To prevent premature cooling of the homogenous solution, the inert material is also at a temperature that is approximately the same as the homogenous solution. The amount of homogenous solution present in the dispersed solution will be dependent on the size of droplets desired. Typically, a lower amount of homogenous solution present and a higher shear rate of mixing will generate smaller droplets. The homogenous solution containing the high molecular weight polymer and low molecular weight material may be present at not more than about 50% by weight of the dispersed solution, or alternatively not more than about 10%, or alternatively not more than about 8%.

The choice of inert material used to disperse the homogenous solution into is based on what high molecular weight polymer and low molecular weight material are used. The only limitation is that the inert material should not be a good solvent for either the high molecular weight polymer or the low molecular weight material, meaning the high molecular weight polymer and the low molecular weight material should be phase separated from the inert material at the mixing temperature of the dispersed solution.

The dispersed solution is formed by mixing together the homogenous solution and the inert material, preferably in a high speed agitator such as a high-shear mixer at a rate of at least 300 rpm, preferably at least 500 rpm, and more preferably at least 1,000 rpm. The mixing temperature may be from 0° C. to 500° C., or alternatively from 100° C. to 250° C., or alternatively from 150° C. to 200° C. The mixing time may be from about 1 to 120 minutes, or alternatively from about 2 to 90 minutes.

Optionally, a surfactant may be added to the dispersed solution. A surfactant may be utilized to better stabilize the dispersed droplets of homogenous solution. This enables smaller droplets of the homogenous solution to be formed in the dispersed solution.

Exemplary surfactants include, but are not limited to, cationic surfactants, anionic surfactants, and nonionic surfactants. Surfactants of the nonionic type are preferable. Silicone surfactants are preferably selected as the nonionic surfactant. Exemplary silicone surfactants include, but are not limited to, polydimethylsiloxane-block-polyethlyene, poiydimethylsiloxane-block-polypropylene, polydimethylsiloxane-block-polyethylene oxide, polydimethylsiloxane-block-polypropylene oxide, polydimethylsiloxane-block-ethylene oxide-co-polypropylene oxide, polydimethylsiloxane-block-styrene-co ethylene, polydimethylsiloxane-block-polyamides, polydimethylsilaxane-block-polyimides, polydimethylsiloxane-block-polyethers, polydimethylsiloxane-block-polyesters, the grafted-type block copolymers of the above, and a mixtures thereof.

After forming the dispersed solution, the dispersed solution is cooled to a temperature that causes the high molecular weight polymer and low molecular weight material to begin to phase separate inside the droplets. As a result, spinodal decomposition takes place inside the dispersed homogenous solution droplets, i.e. long wavelength concentration fluctuations occur, forming a bi-continuous phase morphology inside each droplet.

Once phase separation inside the droplets has started, the droplets are then formed into solid particles containing a polymeric structure of cells, with the low molecular weight material being trapped inside the cell structure. The droplets may be formed into solid particles by either (1) using a crystallizable polymer as the high molecular weight polymer and cooling the droplets to a temperature below the crystallization temperature of the crystallizable polymer, (2) by using an amorphous polymer as the high molecular weight polymer and cooling the droplets below the glass transition temperature of the amorphous polymer, or (3) cross-linking the high molecular weight polymer.

If the solid particles are formed by using a crystallizable polymer as the high molecular weight polymer and cooling the droplets below the crystallization temperature of the crystallizable polymer, or by using an amorphous polymer as the high molecular weight polymer and cooling the droplets below the glass transition temperature of the amorphous polymer, the rate of cooling can vary depending on the high molecular weight polymer and low molecular weight material used. Additionally, the size of the cells can be controlled by varying the cooling rate. A faster cooling rate will typically provide smaller cell diameters. Exemplary cooling rates may be between about 1° C. to about 50° C. per minute.

If the solid particles are formed by cross-linking the high molecular weight polymer, cross-linking may be done by mixing vulcanizing agents, such as sulfur, vulcanization accelerators, and organic peroxides, into the homogenous solution containing the high molecular weight polymer and low molecular weight material. To form the solid particles, the dispersed droplets containing the vulcanizing agents are heated to a temperature to cause cross-links to form. This is well known to those skilled in the art. Alternatively, the droplets of homogenous solution may be cross-linked by exposing the droplets to radiation, such as ultraviolet radiation.

After forming the solid particles, they are then removed from the inert material. The particles may be removed, for example, by filtration, precipitation, or centrifuging.

Optionally, after removing the micro-sized particles from the inert material, the trapped low molecular weight material may be removed to leave behind a three-dimensional porous micro-sized particle, wherein the high molecular weight polymer cell structure defines the pores. Any desired technique may be used for removing the low molecular weight material from the micro-sized particles. For example, the low molecular weight material may be removed by solvent extraction. Any solvent that dissolves the low molecular weight material is acceptable, so long as the high molecular weight polymer structure is not soluble in the solvent. Exemplary solvents include, but are not limited to, aromatic hydrocarbons such as xylene, toluene and benzene, unsaturated aliphatic hydrocarbons such as hexene and pentene, saturated aliphatic hydrocarbons such as hexane and pentane, ketones such as acetone and methyl ethyl ketone, alcohols such as ethanol and butanol, chlorinated aliphatic hydrocarbons such as methylene chloride and chloroform, alicyclic hydrocarbons such as cyclohexanone, ethers such as dioxane and tetrahydrofuran, and esters such as butyl acetate, supercritical gases such as carbon dioxide, and water. One ore more solvent extraction steps may be carried out.

Optionally, after removing the low molecular weight material, the pores of the micro-sized particles may be impregnated with a functional material. The functional material may be either a solid or a liquid. Exemplary functional materials include inks, pharmaceutical substances, fragrances, electrolytes, liquid crystals, magnetic fluids, electroviscous fluids, and electrically conductive polymers.

To impregnate the pores with a functional liquid material, the liquid may be exposed to the micro-sized particles to allow the functional material to be absorbed into the pores. Optionally, the liquid functional material may be diluted with a suitable solvent. If the functional material is solid, it may be melted or dissolved in a solvent, followed by allowing the melt or solution to be absorbed into the pores. If the functional material is a solid that does not melt at a relatively high temperature, it may be premixed with another liquid or solid which does melt at such high temperature.

Examples of the functional material which is liquid at room temperature include electrolyte solution, plating solution, liquid crystal, magnetic fluid, electrorheological fluid, reactive organic material, etc. By impregnating a microporous body with organic or inorganic electrolyte solution, there is formed a semi-solid electrolyte which may find use in paper cells and electrochromic devices. By impregnating a microporous body with plating solution, there is formed an impregnated body which is interposed between a plating member and a member to be plated to carry out dry plating. By impregnating a microporous body with liquid crystal, there is formed a dimming element which may find use in liquid crystal displays and variable transmission blinds. In the case of magnetic fluid, the impregnated microcellular composite may find use as flexible magnets and clean seals. In the case of electrorheological fluid, the impregnated microcellular composite may find use as vibration damping devices. In the case of reactive organic materials, microporous bodies are separately impregnated with mutually reactive organic materials, and the impregnated bodies are placed in close contact whereupon the organic materials react with each other to form a reaction product which is reinforced by the three-dimensional continuous network of high molecular weight polymer. This is applicable to reactive two-part adhesive for dry adhesion and reactive two-part paint. Using a dye as the functional material, a printing member can be prepared. More particularly, a dye is blended with a softener, plasticizer, tackifier, oligomer or lubricant to form an ink composition with which a microporous body is impregnated.

Other useful functional materials include latex, emulsion, bitumen, clay, natural starch, saccharides, inorganic silicone oil, and phosphazenes. Also included are animal oils such as beef tallow, lard, horse tallow, chicken oil, and fish oil; honey, fruit juice, chocolate, dairy products such as yogurt; organic solvents such as hydrocarbon, halogenated hydrocarbon, alcohol, phenol, ether, acetal, ketone, fatty acid, ester, nitrogen compound and sulfur compound solvents; various pharmaceutical components, proteins, soil modifiers, fertilizers, petroleum, water, and aqueous solutions.

Where pharmaceutical components are used as the functional material, for example, there may be obtained pharmaceutical external preparations, such as fomentation. Any of pharmaceutical components which are dermatologic may be used. In the case of a medication intended for local action, the filled microcellular composite allows the medication to penetrate a specific area. In the case of a medication intended for systemic action, the filled microcellular composite allows the medication to transfer into blood. A further example of a functional material for pharmaceutical use includes proteins.

Further typical functional materials are fragrant components. Exemplary fragrant components are natural flavors such as lemon oil, lime oil, spearmint oil, jasmine oil, orange oil pine oil, menthol oil, eucalyptus oil, lavender oil, and musk oil; and synthetic flavors derived therefrom, such limonene, eugenol, citronellol, vanillin, carvone, ionc muscone, rose oxide, indole, geranyl acetate, and ethyl benzoate. They may be used alone or in admixture.

The functional materials which are solid at room temperature include polymers, for example, conductive polymers such as polyaniline, polypyrrole, and polyacetylene, photoconductive polymers such as phthalocyanine derivatives, and water absorbing polymers such as chitin, chitosan, acrylic acid polymers and polyvinyl alcohol (PVA). Also useful are ceramic materials such as barium titanate and zinc zirconate having piezoelectric properties, and titanium oxide having light absorbing properties, metals having conductive or magnetic properties, and carbon and other powders having conductive, gas adsorbing or deodorant properties. Where ordinary thermoplastic or thermosetting polymers or organic materials are used as the functional material, there are obtained composite materials in which the thermoplastic or thermosetting resins are improved in impact resistance, strength and elongation.

Alternatively, the desired functional material may be used as the low molecular weight material when making the homogenous solution. This enables a functional composite to be obtained in fewer steps by allowing a functional material to be trapped inside the polymeric structure of cells upon formation of the solid particles. Specifically, it makes it unnecessary to first remove a non-functional low molecular weight material from the micro-sized particles before impregnating the pores with a functional material.

The filled microcellular composites effectively retain the functional material which is liquid or solid at room temperature and allow the functional material to be slowly released over a long time, thus finding a variety of applications.

The particles formed by the process described above are micro-sized particles that may be any size, but typically will have an average diameter between 1 and 500 micrometers, or between 10 and 500 micrometers, or between 10 and 300 micrometers. The average diameter of the cells (i.e. pores) inside the micro-sized particle may be any size, but typically will be between 0.1 and 50 micrometers, or between 0.1 and 30 micrometers, or between 0.1 and 20 micrometers.

Examples

A high molecular weight block copolymer of polyethylene and ethylene-butene copolymer having a Mn of 220,000, commercially available as Dynaron 6100P from the JSR Co., was blended with diisodecyl adipate having a Mn of 427. The high molecular weight copolymer was present at 12% by weight of the blend. The blend was formed into a homogenous solution by heating the blend to a temperature of 180° C. while mixing.

A dispersed solution was then formed by mixing 50 grams of the homogenous solution, while still at 180° C., into 600 grams of silicone oil. The silicone oil was at a temperature of 180° C. The mixing was conducted in a high-shear mixer at a temperature of 200° C. and a rate of 2,000 rpm for one hour.

The dispersed solution was then allowed to cool to 23° C. at a rate of about 5° C. per minute. The polymer particles were then filtered from the dispersed solution. The polymer particles were then washed with acetone and hexane, followed by a mixture of toluene and hexane.

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

It is claimed:

1. A method of forming a polymeric structure of cells inside micro-sized particles, comprising the steps of:
    a. forming a homogenous solution by heating a mixture of a high molecular weight polymer having a Mn of at least 20,000 and a low molecular weight material having a Mn of less than 20,000, wherein said low molecular weight material makes up at least about 50% by weight of the homogenous solution,
    b. forming a dispersed solution by dispersing the homogenous solution formed in step (a) into an inert material, wherein the homogenous solution formed in step (a) is phase separated from the inert material,
    c. cooling the dispersed solution formed in step (b) to cause the high molecular weight polymer to phase separate from the low molecular weight material,
    d. forming solid particles comprised of said low molecular weight material trapped inside a structure of cells of said high molecular weight polymer, and
    e. removing the solid particles formed in step (d) from the dispersed solution.

2. The method of claim 1, further comprising removing the low molecular weight material from said solid particles obtained in step (e).

3. The method of claim 2, wherein said low molecular weight material is removed from said solid particles by solvent extraction.

4. The method of claim 1, wherein said high molecular weight polymer is crystallizable, and said solid particles are formed in step (d) by cooling the dispersed solution below the crystallization temperature of the high molecular weight crystallizable polymer.

5. The method of claim 1, wherein said solid particles are formed in step (d) by cooling the dispersed solution below the glass transition temperature of said high molecular weight polymer.

6. The method of claim 1, wherein said solid particles are formed in step (d) by cross-linking said high molecular weight polymer.

7. The method of claim 1, wherein said low molecular weight material makes up at least about 75% by weight of the homogenous solution formed in step (a).

8. The method of claim 7, wherein the homogenous solution makes up less than about 10% by weight of the dispersed solution formed in step (b).

9. The method of claim 1, wherein said high molecular weight material has a Mn of greater than about 60,000 g/mole, and said low molecular weight material has a Mn of less than about 10,000 g/mole.

10. The method of claim 1, wherein said high molecular weight polymer is selected from the group consisting of poly(ethylene-co-butene), a block copolymer of ethylene and propylene, a block copolymer of polyethylene and an ethylene-styrene random copolymer, a block copolymer of polybutadiene and polystyrene, a block copolymer of polyethylene and polystyrene, a block copolymer of hydrogenated styrene-butadiene copolymers, a butadiene block copolymer, polypropylene, polyethylene, polycarbonate, polyethylene oxide, polyimides, polyurethane, nylons, syndiotactic polystyrene, syndiotactic polybutadiene, isotactic polystyrene, polyethylene alcohol, and a mixture thereof.

11. The method of claim 1, wherein said low molecular weight material is selected from the group consisting of softening agents, plasticizers, tackifiers, oligomers, lubricants, petroleum hydrocarbons, and mixtures thereof.

12. The method of claim 1, further comprising adding a surfactant to the dispersed solution formed in step (b).

13. The method of claim 12, wherein said surfactant is selected from the group consisting of polydimethylsiloxane-block-polyethlyene, polydimethylsiloxane-block-polypropylene, polydimethylsiloxane-block-polyethylene oxide, polydimethylsiloxane-block-polypropylene oxide, polydimethylsiloxane-block-ethylene oxide-co-polypropylene oxide, polydimethylsiloxane-block-styrene-co ethylene, polydimethylsiloxane-block-polyamides, polydimethyl siloxane-block-polyimides, polydimethylsiloxane-block-polyethers, polydimethylsiloxane-block-polyesters, and a mixtures thereof.

14. The method of claim 2, further comprising the step of impregnating the cells of said high molecular weight crystallizable polymer with a functional material.

15. The method of claim 14, wherein said functional material is selected from the group consisting of inks, pharmaceutical agents, fragrances, electrolytes, liquid crystals, magnetic fluids, electroviscous fluids, and electrically conductive polymers.

16. The method of claim 1, wherein at least a portion of the cells are exposed on the surface of the particle.

17. The method of claim 1, wherein said cells have an average diameter between 0.1 and 50 micrometers.

18. The method of claim 1 wherein the cells are not formed by blowing.

19. A method of making a display device including, comprising the steps of:
(1) forming micro-sized particles having a polymeric structure, comprising:
 a. forming a homogenous solution by heating a mixture of a high molecular weight polymer having a Mn of at least 20,000 and a low molecular weight material having a Mn of less than 20,000, wherein said low molecular weight material makes up at least about 50% by weight of the homogenous solution,
 b. forming a dispersed solution by dispersing the homogenous solution formed in step (a) into an inert material, wherein the homogenous solution formed in step (a) is phase separated from the inert material,
 c. cooling the dispersed solution formed in step (b) to cause the high molecular weight polymer to phase separate from the low molecular weight material,
 d. forming solid particles comprised of said low molecular weight material trapped inside a structure of cells of said high molecular weight polymer, and
 e. removing the solid particles formed in step (d) from the dispersed solution; and
(2) incorporating the micro-sized particles in the display device.

20. The method of claim 19, wherein the display device is an electronic paper, electrochromic, or liquid crystal display device.

* * * * *